US010152410B2

(12) United States Patent
Solihin

(10) Patent No.: US 10,152,410 B2
(45) Date of Patent: Dec. 11, 2018

(54) MAGNETORESISTIVE RANDOM-ACCESS MEMORY CACHE WRITE MANAGEMENT

(71) Applicant: Empire Technology Development LLC, Wilmington, DE (US)

(72) Inventor: Yan Solihin, Raleigh, NC (US)

(73) Assignee: Empire Technology Development LLC, Wilmington, DE (US)

( * ) Notice: Subject to any disclaimer, the term of this patent is extended or adjusted under 35 U.S.C. 154(b) by 30 days.

(21) Appl. No.: 14/442,093

(22) PCT Filed: Mar. 28, 2014

(86) PCT No.: PCT/US2014/032215
§ 371 (c)(1),
(2) Date: May 11, 2015

(87) PCT Pub. No.: WO2015/147868
PCT Pub. Date: Oct. 1, 2015

(65) Prior Publication Data
US 2016/0048447 A1 Feb. 18, 2016

(51) Int. Cl.
*G06F 12/08* (2016.01)
*G06F 12/02* (2006.01)
(Continued)

(52) U.S. Cl.
CPC ...... *G06F 12/0238* (2013.01); *G06F 12/0875* (2013.01); *G06F 12/0893* (2013.01); *G06F 12/123* (2013.01); *G06F 12/126* (2013.01); *G06F 2212/222* (2013.01); *G06F 2212/604* (2013.01); *Y02D 10/13* (2018.01)

(58) Field of Classification Search
None
See application file for complete search history.

(56) References Cited

U.S. PATENT DOCUMENTS 7,039,765 B1 * 5/2006 Wilkes ............... G06F 12/0866
711/113
8,868,838 B1 * 10/2014 Glasco ................ G06F 12/126
711/133
(Continued)

FOREIGN PATENT DOCUMENTS

WO 2013048497 A1 4/2013

OTHER PUBLICATIONS

Chang, M-T., et al., "Technology Comparison for Large Last-Level Caches (L3Cs): Low-Leakage SRAM, Low Write-Energy STT-RAM, and Refresh-Optimized eDRAM," IEEE 19th International Symposium on High Performance Computer Architecture, pp. 143-154 (Feb. 23-27, 2013).
(Continued)

*Primary Examiner* — Tracy C. Chan

(57) ABSTRACT

Technologies are generally described manage MRAM cache writes in processors. In some examples, when a write request is received with data to be stored in an MRAM cache, the data may be evaluated to determine whether the data is to be further processed. In response to a determination that the data is to be further processed, the data may be stored in a write cache associated with the MRAM cache. In response to a determination that the data is not to be further processed, the data may be stored in the MRAM cache.

22 Claims, 7 Drawing Sheets

(51) Int. Cl.
*G06F 12/0893* (2016.01)
*G06F 12/123* (2016.01)
*G06F 12/0875* (2016.01)
*G06F 12/126* (2016.01)

(56) References Cited

U.S. PATENT DOCUMENTS

| | | | |
|---|---|---|---|
| 2004/0193782 A1 | 9/2004 | Bordui | |
| 2005/0080994 A1* | 4/2005 | Cohen | G06F 1/3225 711/118 |
| 2005/0262305 A1* | 11/2005 | Chow | G06F 12/023 711/133 |
| 2007/0043908 A1* | 2/2007 | Diefendorff | G06F 12/0862 711/137 |
| 2009/0031082 A1 | 1/2009 | Ford et al. | |
| 2010/0057984 A1* | 3/2010 | Chen | G06F 12/0804 711/113 |
| 2010/0235579 A1* | 9/2010 | Biles | G06F 12/0862 711/125 |
| 2011/0022801 A1 | 1/2011 | Flynn | |
| 2011/0289257 A1* | 11/2011 | Hathaway | G06F 12/12 711/3 |
| 2012/0054421 A1* | 3/2012 | Hiratsuka | G06F 12/0246 711/103 |
| 2012/0089714 A1* | 4/2012 | Carley | H04L 69/28 709/223 |
| 2012/0191944 A1 | 7/2012 | Gonion | |
| 2013/0166846 A1* | 6/2013 | Gaur | G06F 12/0897 711/122 |
| 2014/0143481 A1* | 5/2014 | Asnaashari | G06F 13/00 711/103 |
| 2014/0304475 A1* | 10/2014 | Ramanujan | G06F 12/0895 711/128 |
| 2017/0068622 A1* | 3/2017 | Chang | G06F 12/0862 |

OTHER PUBLICATIONS

International Search Report and Written Opinion for counterpart International Patent Application No. PCT/US2014/032215 dated Sep. 4, 2014.

Kharbutli, M., and Solihin, Y., "Counter-Based Cache Replacement Algorithms," Proceedings. 2005 IEEE International Conference on Computer Design: VLSI in Computers and Processors, pp. 61-68 (Oct. 2-5, 2005).

Kharbutli, M., and Solihin, Y., "Counter-Based Cache Replacement and Bypassing Algorithms," IEEE Transactions on Computers, vol. 57, No. 4, pp. 433-447 (Apr. 2008).

Liu, H., et al., "Cache Bursts: A New Approach for Eliminating Dead Blocks and Increasing Cache Efficiency," Proceedings of the 41st annual IEEE/ACM International Symposium on Microarchitecture, pp. 222-233 (2008).

Sun, G., et al., "A Novel Architecture of the 3D Stacked MRAM L2 Cache for CMPs," IEEE 15th International Symposium on High Performance Computer Architecture, pp. 239-249 (Feb. 14-18, 2009).

* cited by examiner

MAGNETORESISTIVE RANDOM-ACCESS MEMORY CACHE WRITE MANAGEMENT

CROSS-REFERENCE TO RELATED APPLICATIONS

This Application is a U.S. National Stage filing under 35 U.S.C. § 371 of International Application No. PCT/US14/32215, filed on Mar. 28, 2014. International Application No. PCT/US14/32215 is hereby incorporated by reference in its entirety.

BACKGROUND

Unless otherwise indicated herein, the materials described in this section are not prior art to the claims in this application and are not admitted to be prior art by inclusion in this section.

Magnetoresistive random-access memory (MRAM), including spin transfer torque RAM (STT-RAM) or non-volatile RAM (NV-RAM), is a relatively recent memory technology that has garnered much interest. In particular, MRAM may enable significantly smaller memory cell sizes as compared to current dynamic RAM (DRAM) technology, which may be subject to scaling limitations. MRAM technology may also provide similar or faster read speeds than DRAM, and are non-volatile, meaning that MRAM contents may be maintained without power. In contrast, DRAM is volatile, meaning that DRAM contents are lost if power is not provided.

SUMMARY

The present disclosure generally describes techniques for managing MRAM cache or non-volatile memory (NVM) writes in processors.

According to some examples, methods are provided to manage NVM writes. An example method may include receiving a write request including data to be stored in an NVM, determining whether the data is to be further processed, and storing the data in a write cache associated with the NVM in response to a determination that the data is to be further processed. The method may further include storing the data in the NVM in response to a determination that the data is not to be further processed.

According to other examples, a write cache module is provided to manage MRAM cache writes in processors. The module may include a write cache memory and a processor block. The processor block may be configured to receive a write request including data to be stored in an MRAM cache associated with the write cache module, determine whether the data is to be further processed, and store the data in the write cache memory in response to a determination that the data is to be further processed. The processor block may be further configured to store the data in the MRAM cache in response to a determination that the data is not to be further processed.

According to further examples, an apparatus of a computational device is provided to manage NVM writes. The apparatus may include a processor core, an NVM communicatively coupled to the processor core, a write cache memory associated with and communicatively coupled to the NVM, and a processor block. The processor block may be configured to determine that data is to be stored in the NVM, determine whether the data is to be further processed, and store the data in the write cache memory in response to a determination that the data is to be further processed. The processor block may be further configured to store the data in the NVM in response to a determination that the data is not to be further processed.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
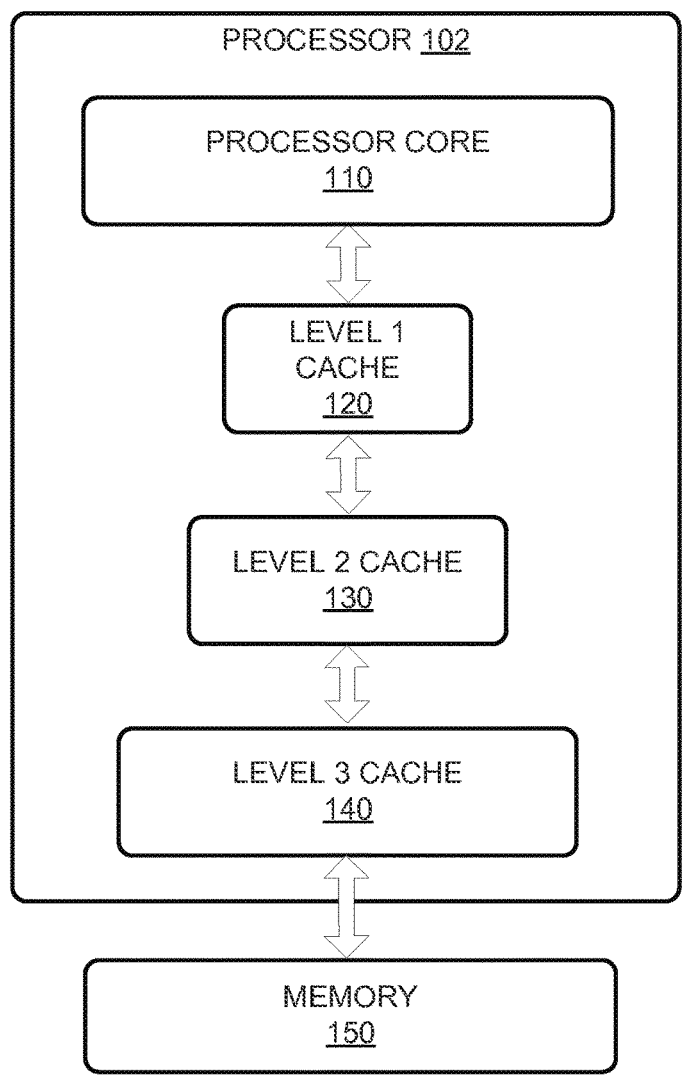
FIG. 1 illustrates an example computer processor system where MRAM cache write management may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to managing magnetoresistive random-access memory (MRAM) cache writes in processors.

Briefly stated, technologies are generally described to manage MRAM cache writes in processors. In some examples, when a write request is received with data to be stored in an MRAM cache, the data may be evaluated to determine whether the data is to be further processed. In response to a determination that the data is to be further processed, the data may be stored in a write cache associated with the MRAM cache. In response to a determination that the data is not to be further processed, the data may be stored in the MRAM cache.

FIG. 1 illustrates an example computer processor system 100 where MRAM cache write management may be implemented, arranged in accordance with at least some embodiments described herein.

According to system 100, a processor 102 may include a processor core 110, a level 1 cache 120, a level 2 cache 130, and a level 3 cache 140. Processor core 110 may be configured to retrieve data from and send data to the level 1 cache 120. The level 1 cache 120, in addition to receiving and providing data to the processor core 110, may also be configured to exchange data with the level 2 cache 130. The level 2 cache 130 in turn may be configured to exchange data with both the level 1 cache 120 and the level 3 cache 140. The level 3 cache 140 may in turn be configured to exchange data with both the level 2 cache 130 and a memory 150 external to processor 102. The level 1 cache 120 may be said to be the predecessor of the level 2 cache 130. The level 3 cache 140 may be said to be the successor of the level 2 cache 130. Similarly, the level 2 cache 130 may be said to be the predecessor of the level 3 cache 140.

The level 1 cache 120, level 2 cache 130, and level 3 cache 140 may be implemented using random-access memory, and may have different data storage capacities, because storage capacity may affect data read and write speeds. For example, the level 1 cache 120 may communicate directly with the processor core 110 and may store data and instructions frequently used by the processor core 110. To avoid slowing down the processor core 110, the storage capacity of the level 1 cache 120 may be selected such that its data read/write speeds are commensurate with the operating speed of the processor core 110. Data and instructions that are not used as frequently by the processor core 110 as the data and instructions stored in the level 1 cache 120 may be stored in the level 2 cache 130, which may have a larger storage capacity than the level 1 cache 120. Similarly, data and instructions that are not used as frequently by the processor core 110 as the data and instructions stored in the level 2 cache 130 may be stored in the level 3 cache 140, and other data and instructions may be stored in the memory 150 external to processor 102.

When the processor core 110 is to process data or execute instructions, the processor core 110 may request the data/instructions from the level 1 cache 120. The level 1 cache 120 may then determine whether it stores the requested data/instructions. If so, the level 1 cache 120 may then provide the requested data/instructions to the processor core 110. If the level 1 cache 120 does not store the requested data/instructions, the level 1 cache 120 may then forward the request to the level 2 cache 130. The level 2 cache 130 may then provide the requested data/instructions to the level 1 cache 120 if the level 2 cache 130 stores the requested data/instructions, and may forward the request to the level 3 cache 140 if the level 2 cache 130 does not. Likewise, the level 3 cache 140 may then either provide the requested data/instructions to the level 2 cache 130 or forward the request to the memory 150.

While only three levels of cache are depicted in system 100, in other embodiments more or fewer levels of caches may be used.

In some embodiments, one or more processor caches (for example, the level 1 cache 120, the level 2 cache 130, and/or the level 3 cache 140) may be implemented using MRAM.

As described above, MRAM-based memory may provide advantages over DRAM-based memory, such as smaller memory cell sizes, similar or faster read speeds, and non-volatility. However, writing data to MRAM-based memory may take significantly more time and energy than writing to DRAM-based memory. For example, writing data to MRAM may take about six times as long as writing data to DRAM, and may consume about nine to eleven times as much energy as writing data to DRAM. As a result, MRAM-based caches may benefit from techniques to reduce data write time and energy.

Figure 2:
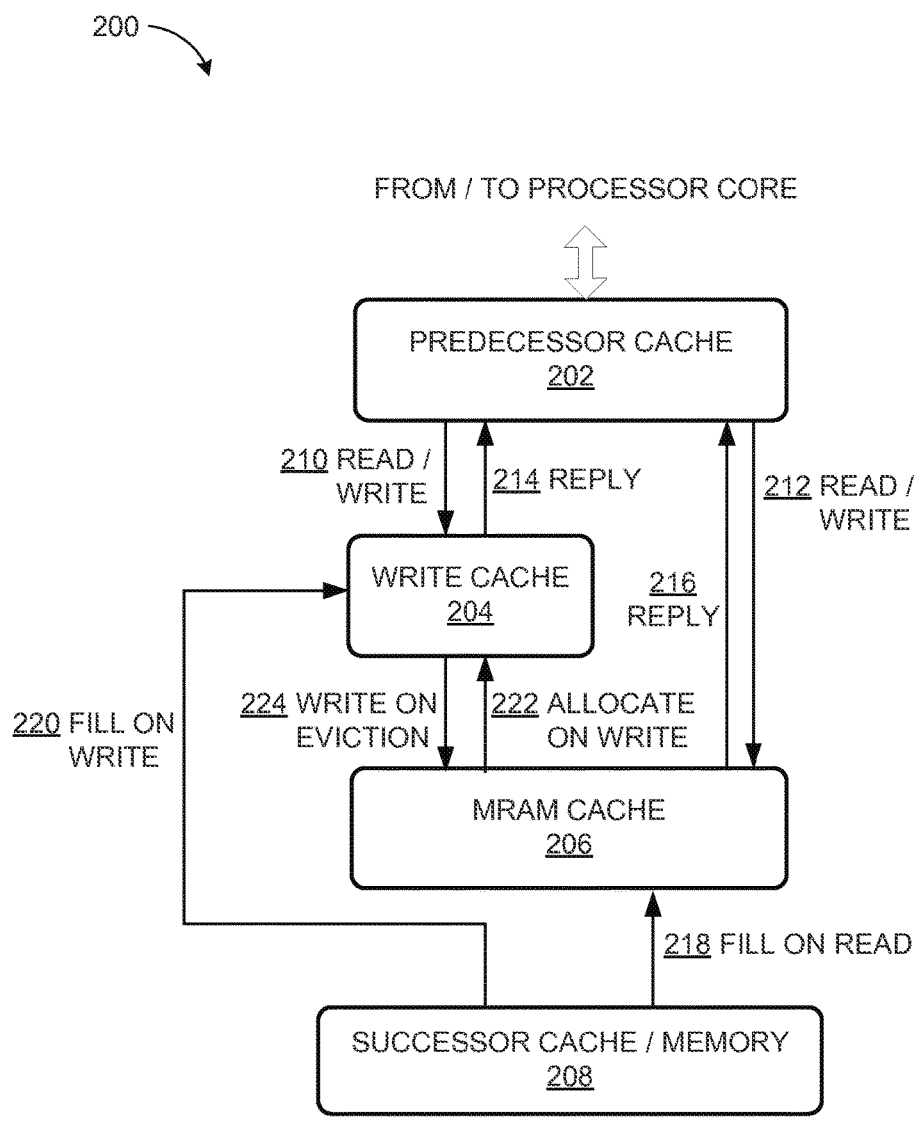
FIG. 2 illustrates an example system where MRAM cache write management using a write cache may be implemented.

FIG. 2 illustrates an example system 200 where MRAM cache write management using a write cache may be implemented, arranged in accordance with at least some embodiments described herein.

According to system 200, a predecessor cache 202 may exchange data with a write cache 204 and an MRAM cache 206. The write cache 204 may in turn exchange data with the MRAM cache 206. A successor cache or memory 208 may provide data to both the write cache 204 and the MRAM cache 206.

As depicted in system 200, the MRAM-based cache 206 may be located between the predecessor cache 202 and the successor cache or memory 208. For example, MRAM cache 206 may be similar to the level 2 cache 130 or the level 3 cache 140 in FIG. 1. Of course, in some embodiments MRAM cache 206 may be similar to the level 1 cache 120.

As described above, in some embodiments techniques to reduce the time and energy of MRAM write operations may be useful. One technique may include first storing data to be written to MRAM at a non-MRAM write cache in order to reduce the total number of MRAM writes.

The write cache 204 located between the MRAM cache 206 and the predecessor cache 202 may be used to reduce data write time and energy consumption associated with the MRAM cache 206. The write cache 204 may not be implemented in MRAM memory, and may instead be implemented as DRAM or some other suitable memory type. In some embodiments, the write cache 204 and the MRAM cache 206 may be mutually exclusive, such that data stored in the write cache 204 is not stored in the MRAM cache 206, and vice-versa. When a processor core (for example, processor core 110) requests data that is not located in predecessor cache 202, predecessor cache 202 may transmit a signal 210 with a read request to the write cache 204 and a signal 212 with a read request to the MRAM cache 206. If the data is found at either the write cache 204 or the MRAM cache 206, then the data may be returned to the predecessor cache 202 from the write cache 204 as reply 214 or from the MRAM cache 206 as reply 216. On the other hand, if the data is not stored in either the write cache 204 or the MRAM cache 206, then the data may be requested from successor cache/memory 208. The successor cache/memory 208 may then send a fill-on-read signal 218 containing the data to the MRAM cache 206, which may then transmit the data to the predecessor cache 202 in reply 216.

When the processor core requests a write to data (or a modification to existing data) that is not located in predecessor cache 202, the predecessor cache 202 may transmit the signal 210 with a write request to the write cache 204 and the signal 212 with a write request to the MRAM cache 206. If the data is located in the write cache 204, then the data may be written at the write cache 204. If the data is found in the MRAM cache 206, then the MRAM cache 206 may transmit an allocate-on-write signal 222 containing the data to the write cache 204, which may then perform the write. If the data is not in the write cache 204 or the MRAM cache 206, then the data may be requested from the successor cache/memory 208. The successor cache/memory 208 may then provide the data in a fill-on-write signal 220 sent directly to the write cache 204, which may then perform the write. In all of the write cases above, the write operation may happen at the write cache 204, which may result in a reduction of the number of write operations at the MRAM cache 206 and a corresponding reduction in write time and energy consumption.

Since the write cache 204 has a finite size, it may be useful to periodically or otherwise repeatedly clear space for other data in the write cache 204. This may be done by writing some of the data stored in the write cache 204 to the MRAM cache 206 using a write-on-eviction signal 224. An eviction policy may be used to identify the data in the write cache 204 that can be written to the MRAM cache 206. As noted above, writing data at the write cache 204 may reduce the number of write operations at the MRAM cache 206. In general, it may be more useful to store data that is written more often in the write cache 204 than data that is written less often. As a result, if space is to be cleared at the write cache 204, it may be more useful to move data that is written less often from the write cache 204 to the MRAM cache 206. Accordingly, the eviction policy may be designed to identify the data in the write cache 204 that is least likely to be written to again.

In some embodiments, the eviction policy may be based on a least-recently-written parameter associated with the data. For example, the data block in the write cache 204 that was least recently written (that is, the time period since the data block was last written is longer than that of any other data block) may be more likely to be evicted from the write cache 204 and written to the MRAM cache 206 than the other data blocks. The eviction policy may also be based on a predictive write-dead time, which may be the predicted time period between the last write to a particular data block and its natural eviction time. By evicting the data block from the write cache 204 earlier than its natural eviction time and writing the data block to the MRAM cache 206, additional space in the write cache 204 may be freed without adverse impact.

In some embodiments, the eviction policy may also be based on a last-write parameter. The last-write parameter may indicate the likelihood that a particular data block in the write cache 204 has been written for the last time before its natural eviction time, similar to the last write described above in the context of the write-dead time. In some embodiments, the last-write parameter may be based on a number-of-previous-writes parameter associated with the data block (that is, the number of times the data block has been previously written). The last-write parameter may also be based on a number-of-bursts-of-writes parameter associated with the data block, where a burst-of-writes may be defined as a period of continuous accesses or writes to the data block that is not interleaved with accesses to other data blocks. The last-write parameter may also be based on a time-interval-of-cache-residency parameter associated with the data block, which may measure the amount of time the data block has been stored in the write cache 204.

Figure 3:
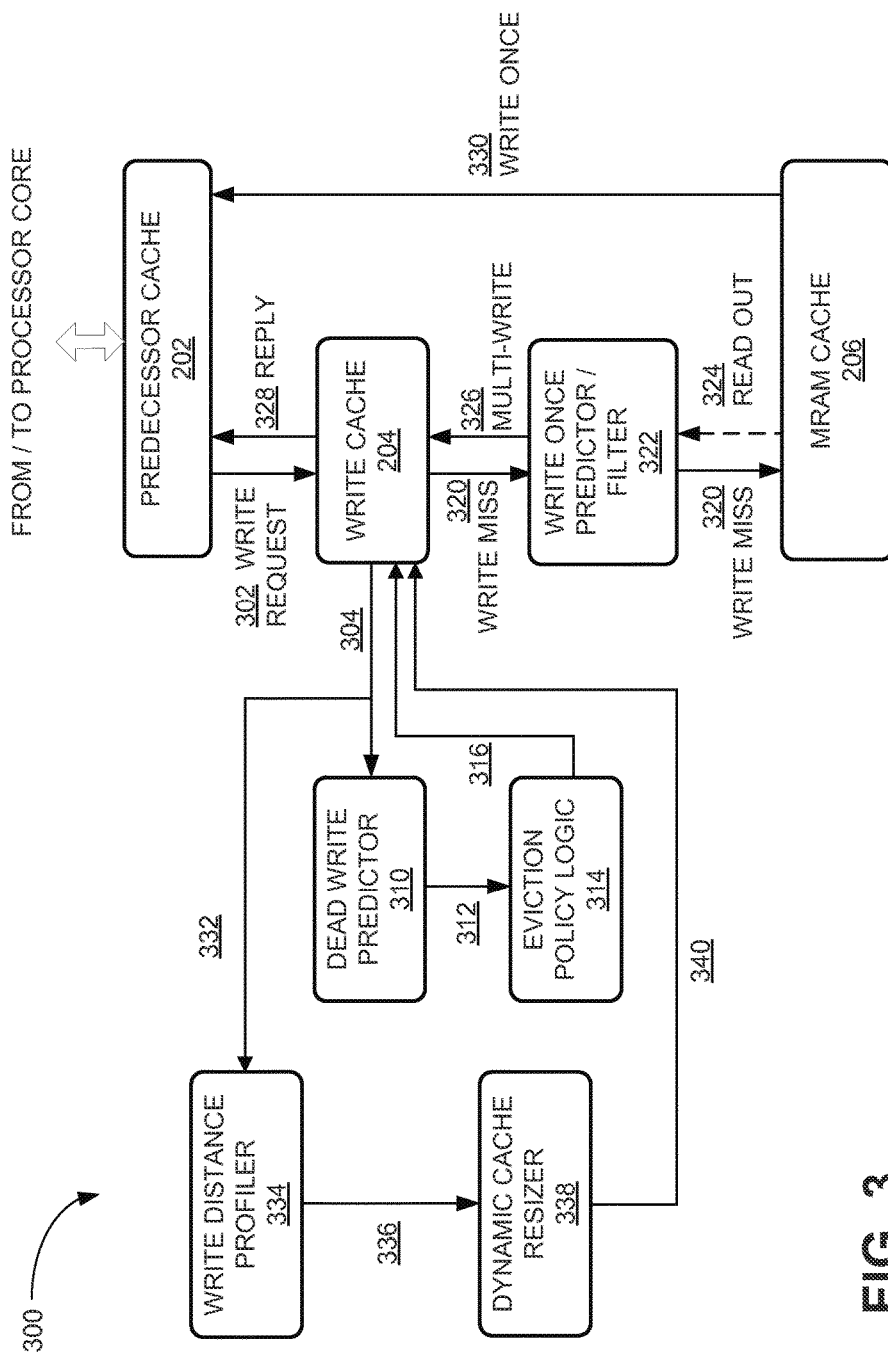
FIG. 3 illustrates an example system where MRAM cache write management using the write cache of FIG. 2 and various optimization modules may be implemented.

FIG. 3 illustrates an example system 300 where MRAM cache write management using the write cache of FIG. 2 and various optimization modules may be implemented, arranged in accordance with at least some embodiments described herein.

According to system 300, somewhat similar to system 200, predecessor cache 202 may exchange data with write cache 204 and MRAM cache 206. The write cache 204 may in turn exchange data with the MRAM cache 206 via a write once predictor/filter 322. The write cache 204 may also communicate with a dead write predictor 310, eviction policy logic 314, write distance profiler 334, and dynamic cache resizer 338.

When the predecessor cache 202 sends a write request 302 to the write cache 204, the write cache 204 may determine whether it stores the data to be written. If the write cache 204 does store the data, then the write cache 204 may then transmit write information 304 to the dead write predictor 310, which may determine whether the write request 302 is likely to be the last write for the data while the data is still in the write cache 204 (that is, before its natural eviction time), as described above. The dead write predictor 310 may then transmit its last write prediction 312 to eviction policy logic 314, which may then transmit a signal 316 to the write cache 204 indicating whether the data should be considered for early eviction from the write cache 204.

If the write cache 204 determines that it does not store the data to be written, the write cache 204 may transmit a write miss signal 320 to the write once predictor/filter 322, which may then forward the write miss signal 320 on to the MRAM cache 206. The data may then be found in the MRAM cache 206 or in a successor cache/memory. In either case, the write once predictor/filter 322 may determine whether the data is likely to be only written once. In some embodiments, it may be undesirable to store data that will only be written once in the write cache 204. Instead, if data is to be only written once, then it may be useful to perform the write in the MRAM cache 206 directly, thereby avoiding having to store the data in the write cache 204, write the data at the write cache 204, then having to evict the data from the write cache 204 and write the data in the MRAM cache 206 anyway.

If the write once predictor/filter 322 determines that the data is likely to be written more than once, the write once predictor/filter 322 may read the data out from the MRAM cache 206 in a read out signal 324 and store the data in the write cache 204 using a multi-write signal 326. On the other hand, if the write once predictor/filter 322 determines that the data is likely to be written once, the write once predictor/filter 322 may prevent the data from being stored in the write cache 204 and instead allow the data to be written in the MRAM cache 206 using a write once signal 330.

The size of the write cache 204 may also be adjusted dynamically. In some embodiments, the write distance profiler 334 may perform write distance profiling for every write performed by the write cache 204. Write distance profiling may collect data about the reuse pattern of data writes as a function of time. For example, write distance profiling may collect data about the number of writes occurring to the most recently written blocks, the number of writes occurring to the second-most recently written blocks, and so on. Using such data, a write-miss curve can be generated that relates the size of the write cache 204 to the number of writes exposed to the MRAM cache 206 (that is, the number of write misses at the write cache 204 that then have to be written at the MRAM cache 206). The write-miss curve may then be used to guide the size of the write cache 204 in order to achieve a particular level of performance.

Once the write distance profiler 332 has determined the write reuse distance profile, the write distance profiler 334 may transmit the profile 336 to the dynamic cache resizer 338, which may then determine whether the write cache 204 should be resized or not by turning parts of the write cache 204 on or off using a signal 340.

In some embodiments, the dynamic cache resizer 338 may attempt to resize the write cache 204 to reduce energy consumption. As an example, suppose that the initial size of the write cache 204 is S and the write hit rate for the write cache 204 is H. Further suppose that the energy expended per write for the write cache 204 is E and the write energy for the MRAM cache 206 is Em. The total energy usage may then be:

$$TotEnergy = H*E + (1-H)*Em \quad [1]$$

Supposing that now the size of the write cache 204 is to be reduced to S', which may produce a different hit rate H', which consumes E' amount of energy per write. Since S' is less than S, the hit rate H' may be lower in the smaller cache (that is, H'<H), but the energy per write, which may include dynamic as well as static energy, may also be lower in the smaller cache (that is, E'<E). In this case:

$$TotEnergy = H*E + (1-H)*Em \quad [2]$$

$$TotEnergy' = H'*E' + (1-H')*Em \quad [3]$$

In order to reduce energy consumption, TotEnergy' should be less than TotEnergy. Thus, TotEnergy'<TotEnergy, resulting in:

$$H'*(E'-Em) < H*(E-Em), \quad [4]$$

which can be rearranged into:

$$H' < H*(E'-Em)/(E-Em), \quad [5]$$

which may provide a useful indication of whether the write cache 204 should be resized or not. In other words, reduction in overall energy consumption may occur when the new hit rate H' is smaller than a threshold.

Figure 4:
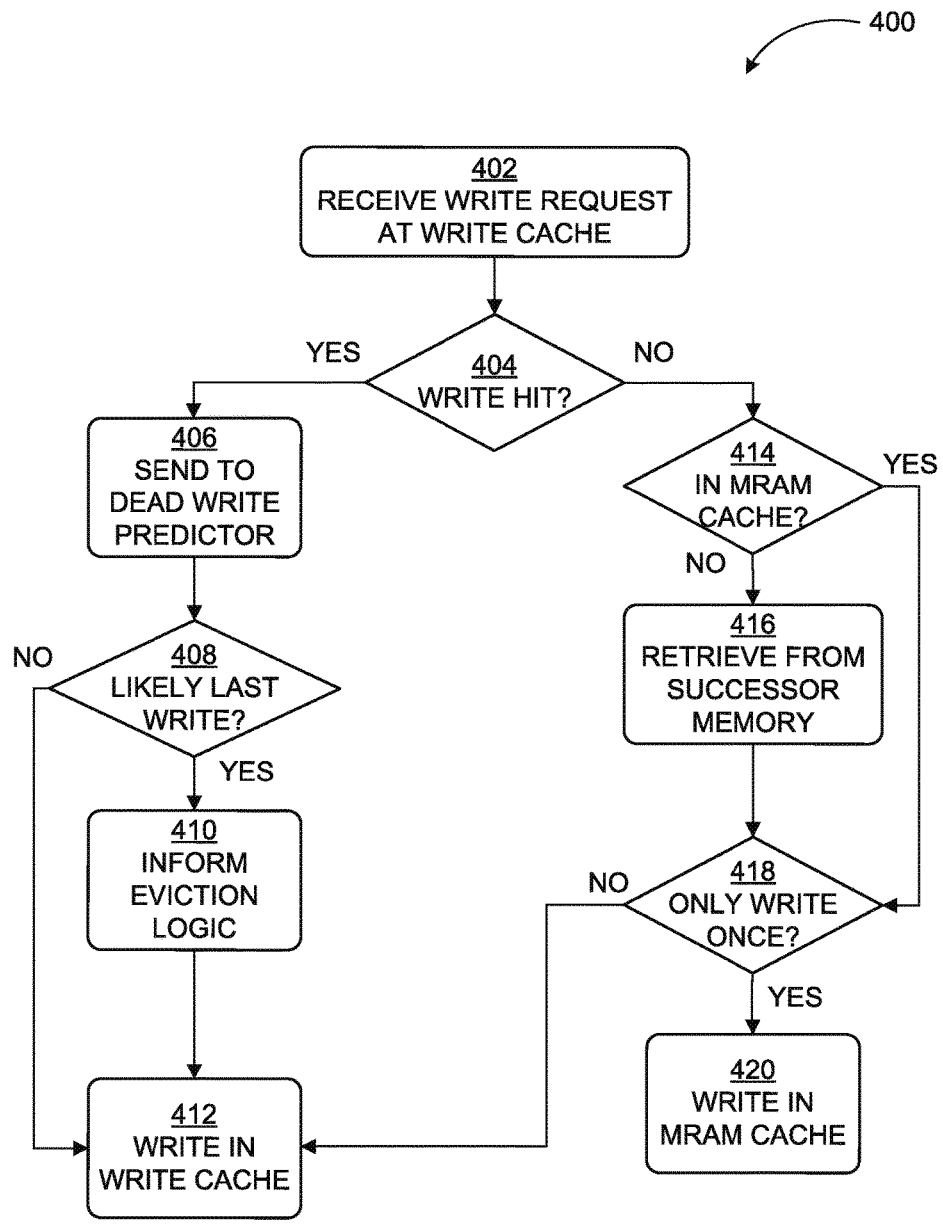
FIG. 4 illustrates an example process for MRAM cache write management using the write cache and the optimization modules of FIG. 3.

FIG. 4 illustrates an example process 400 for MRAM cache write management using the write cache and the optimization modules of FIG. 3, arranged in accordance with at least some embodiments described herein. Process 400 may include one or more operations, functions, or actions as illustrated by one or more of blocks 402-420. Although some of the blocks in process 400 (as well as in any other process/method disclosed herein) are illustrated in a sequential order, these blocks may also be performed in parallel, and/or in a different order than those described herein. Also, the various blocks may be combined into fewer blocks, divided into additional blocks, and/or eliminated based upon the particular implementation. Additional blocks representing other operations, functions, or actions may be provided.

According to process 400, MRAM cache write management may begin at block 402 ("Receive write request at write cache"), in which a write request to write data may be received at a write cache (for example, the write cache 204). At block 404 ("Write hit?"), which may follow block 402, the write cache may determine whether the write request results in a write hit (that is, the data to be written is actually stored at the write cache). If the write request results in a write hit, at block 406 ("Send to dead write predictor"), which may follow block 404, the write cache may then send the write request to a dead write predictor (for example, the dead write predictor 310). At block 408 ("Likely last write?"), which may follow block 406, the dead write predictor may then determine whether the write request is likely to be the last write to the data, as described above. If the dead write predictor determines that the write request is likely to be the last write to the data, at block 410 ("Inform eviction logic"), which may follow block 408, the dead write predictor may inform eviction logic (for example, the eviction policy logic 314). Subsequently, or if the dead write predictor determines that the write request is likely not to be the last write to the data, the data may be written in the write cache at block 412 ("Write in write cache"), which may follow blocks 408 or 410.

If instead at block 404 the write request does not result in a write hit (that is, the data to be written is not stored at the write cache), at block 414 ("In MRAM cache?"), which may follow block 404, a memory controller may determine whether the data is stored in an MRAM cache (for example, the MRAM cache 206). If the data is not stored at the MRAM cache, then at block 416 ("Retrieve from successor memory"), which may follow block 414, the memory controller may retrieve the data from a successor memory (for example, the successor cache/memory 208). Subsequently, or if the data is determined to be stored at the MRAM cache, at block 418 ("Only write once?"), which may follow blocks 414 or 416, a write once predictor/filter (for example, the write once predictor/filter 322) may determine whether the data is likely to be only written once, as described above. If it is determined that the data is likely to be only written once before its natural eviction from the write cache, then at block 420 ("Write in MRAM cache"), which may follow block 418, the memory controller may write the data in the MRAM cache. On the other hand, if it is determined that the data is likely to be written more than once before its natural eviction from the write cache, then at block 412 ("Write in write cache"), which may follow block 418, the memory controller may write the data in the write cache.

While some of the write management embodiments herein are described in the context of non-volatile MRAM caches, write management as described herein may also be implemented with other non-volatile memory (NVM) technologies, which may also suffer from relatively high write latencies and energies. For example, the write management techniques and systems described herein may be implemented for ferroelectric random-access memory (FRAM), flash memory, phase-change random-access memory (PRAM), or other NVM types, and may be implemented for non-cache memory (for example, system memory or storage).

Figure 5:
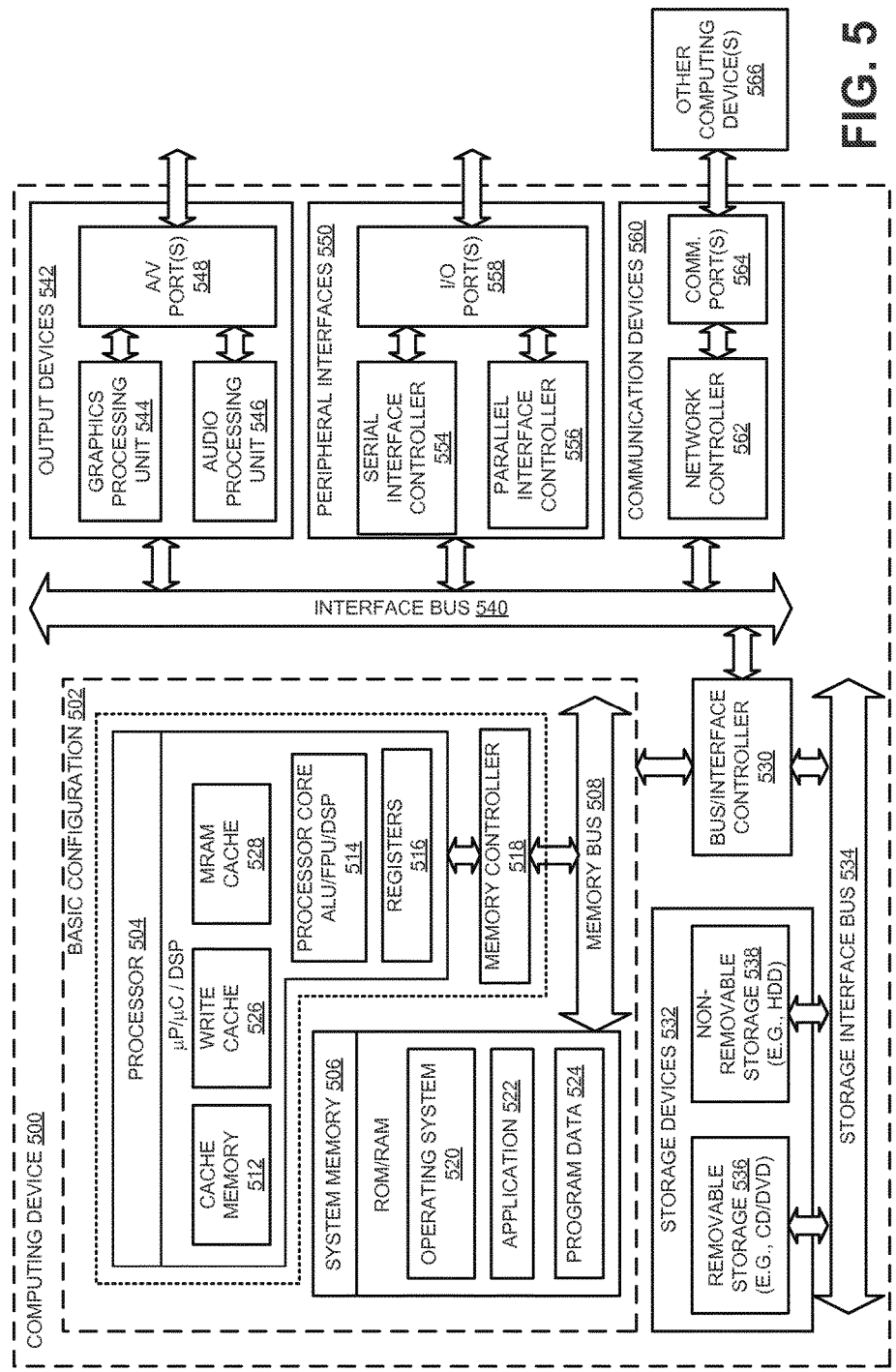
FIG. 5 illustrates a general purpose computing device, which may implement MRAM cache write management.

FIG. 5 illustrates a general purpose computing device, which may implement MRAM cache write management, arranged in accordance with at least some embodiments described herein.

For example, the computing device 500 may implement MRAM cache write management as described herein. In an example basic configuration 502, the computing device 500 may include one or more processors 504 and a system memory 506. A memory bus 508 may be used to communicate between the processor 504 and the system memory 506. The processor 504 may be used to implement the processor 102 of FIG. 1, and the system memory 506 may be used to implement the memory 150 of FIG. 1. The basic configuration 502 is illustrated in FIG. 5 by those components within the inner dashed line.

Depending on the desired configuration, the processor 504 may be of any type, including but not limited to a microprocessor (fP), a microcontroller (ILC), a digital signal processor (DSP), or any combination thereof. The processor 504 may include one more levels of caching, such as a cache memory 512, a write cache 526 (for example the write cache 204), and an MRAM cache 528 (for example the MRAM cache 206). The processor 504 may also include a processor core 514 and registers 516. The example processor core 514 may include an arithmetic logic unit (ALU), a floating point unit (FPU), a digital signal processing core (DSP core), or any combination thereof. An example memory controller 518 may also be used with the processor 504, or in some implementations the memory controller 518 may be an internal part of the processor 504. In some embodiments, the memory controller 518 may perform actions for implementing MRAM cache write management as described herein. For example, the memory controller 518 may implement the write once predictor/filter 322, the dead write predictor 310, the eviction policy logic 314, the write distance profiler 334, and/or the dynamic cache resizer 338 described above in FIG. 3

Depending on the desired configuration, the system memory 506 may be of any type including but not limited to volatile memory (such as RAM), non-volatile memory (such as ROM, flash memory, etc.) or any combination thereof. The system memory 506 may include an operating system 520, one or more applications 522, and program data 524.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM. ROM. EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (e.g., one or more output devices 542, one or more peripheral interfaces 544, and one or more communication devices 566) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 566 includes a network controller 560, which may be arranged to facilitate communications with one or more other computing devices 562 over a network communication link via one or more communication ports 564. The one or more other computing devices 562 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Figure 6:
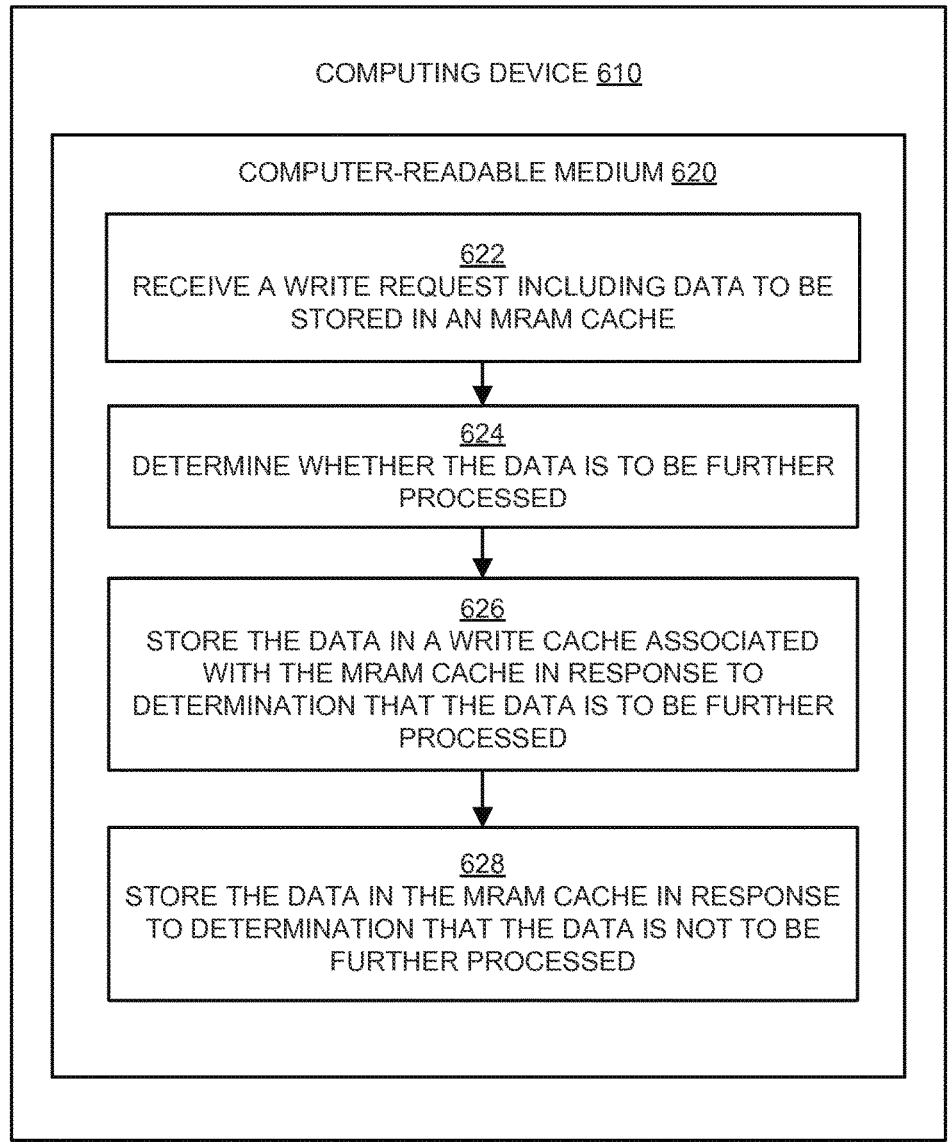
FIG. 6 is a flow diagram illustrating an example method for MRAM cache write management that may be performed by a computing device such as the computing device in FIG. 5.

FIG. 6 is a flow diagram illustrating an example method for MRAM cache write management that may be performed by a computing device such as the computing device in FIG. 5, arranged in accordance with at least some embodiments described herein.

Example methods may include one or more operations, functions or actions as illustrated by one or more of blocks 622, 624, 626, and/or 628, and may in some embodiments be performed by a computing device such as the computing device 500 in FIG. 5. The operations described in the blocks 622-628 may also be performed in response to execution (by one or more processors) of computer-executable instructions stored in a computer-readable medium such as a non-transitory computer-readable medium 620 of a computing device 610. Computing device 610 may be embodied by computing device 500 of FIG. 5

An example process for MRAM cache write management may begin with block 622, "RECEIVE A WRITE REQUEST INCLUDING DATA TO BE STORED IN AN MRAM CACHE", where a write request for data to be stored in an MRAM cache such as the MRAM cache 206 may be received as described above. In some embodiments, a write cache such as the write cache 204 may receive the write request.

Block 622 may be followed by block 624, "DETERMINE WHETHER THE DATA IS TO BE FURTHER PROCESSED", where a write once predictor (for example, the write once predictor/filter 322) may determine whether the data is likely to be written to more than once before it is naturally evicted from a write cache, as described above.

Block 624 may be followed by block 626, "STORE THE DATA IN A WRITE CACHE ASSOCIATED WITH THE MRAM CACHE IN RESPONSE TO DETERMINATION THAT THE DATA IS TO BE FURTHER PROCESSED", where if the write once predictor determines at block 624 that the data will probably be further processed (that is, will be written to more than once), the data may be stored in a write cache associated with the MRAM cache.

Block 626 may be followed by block 628, "STORE THE DATA IN THE MRAM CACHE IN RESPONSE TO DETERMINATION THAT THE DATA IS NOT TO BE FURTHER PROCESSED", where if the write once predictor determines at block 624 that the data will probably not be further processed (that is, will not be written to more than once), the data may be stored in the MRAM cache.

Figure 7:
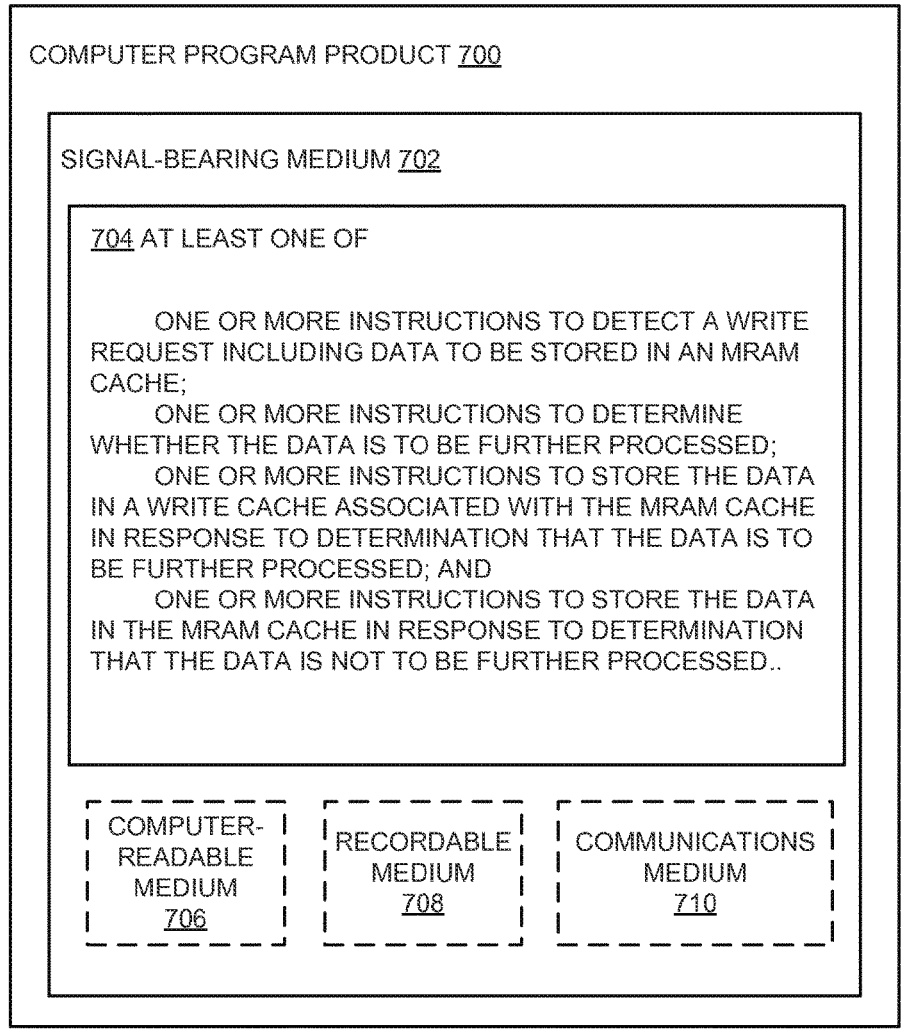
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some examples, as shown in FIG. 7, a computer program product 700 may include a signal bearing medium 702 that may also include one or more machine readable instructions 704 that, in response to execution by, for example, a processor may provide the functionality and features described herein. Thus, for example, referring to the processor 504 in FIG. 5, the memory controller 518 may undertake one or more of the tasks shown in FIG. 7 in response to the instructions 704 conveyed to the processor 504 by the medium 702 to perform actions associated with MRAM cache write management as described herein. Some of those instructions may include, for example, instructions to detect a write request including data to be stored in an MRAM cache, determine whether the data is to be further processed, store the data in a write cache associated with the MRAM cache in response to determination that the data is to be further processed, and/or store the data in the MRAM cache in response to determination that the data is not to be further processed, according to some embodiments described herein.

In some implementations, the signal bearing media 702 depicted in FIG. 7 may encompass computer-readable media 706, such as, but not limited to, a hard disk drive, a solid state drive, a Compact Disc (CD), a Digital Versatile Disk (DVD), a digital tape, memory, etc. In some implementations, the signal bearing media 702 may encompass recordable media 707, such as, but not limited to, memory, read/write (R/W) CDs, R/W DVDs, etc. In some implementations, the signal bearing media 702 may encompass communications media 710, such as, but not limited to, a digital and/or an analog communication medium (e.g., a fiber optic cable, a waveguide, a wired communications link, a wireless communication link, etc.). Thus, for example, the program product 700 may be conveyed to one or more modules of the processor 504 by an RF signal bearing medium, where the signal bearing media 702 is conveyed by the wireless communications media 710 (e.g., a wireless communications medium conforming with the IEEE 802.11 standard).

According to some examples, methods are provided to manage non-volatile memory (NVM) writes. An example method may include receiving a write request including data to be stored in an NVM, determining whether the data is to be further processed, and storing the data in a write cache associated with the NVM in response to a determination that the data is to be further processed. The method may further include storing the data in the NVM in response to a determination that the data is not to be further processed.

According to some embodiments, the method may further include receiving the data from a predecessor cache and/or a successor cache. The data may be a modified version of another data stored in the write cache or the NVM. Storing the data in the write cache and/or the NVM may include storing the data such that the data stored in the write cache and the data stored in the NVM are mutually exclusive. The method may further include receiving a read request for other data, determining whether the other data is stored in the write cache or the NVM, retrieving the other data from a successor cache in response to a determination that the other data is not stored in the write cache or the NVM, and storing the retrieved other data in the write cache.

According to other embodiments, determining whether the data is to be further processed may include determining whether the data is to be further processed based on an eviction policy. The eviction policy may be based on a least-recently-written parameter associated with the data, a write-dead time associated with the data, and/or a last-write parameter associated with the data. The last-write parameter may be based on a number-of-previous-writes parameter associated with the data, a number-of-bursts-of-writes parameter associated with the data, and/or a time-interval-of-cache-residency parameter associated with the data. Determining whether the data is to be further processed may further include determining whether the data is to be further processed based on a determination of whether the data is likely to be written to more than once. The method may further include adjusting a size of the write cache. Adjusting the size of the write cache may include adjusting the size of the write cache based on a write distance profile and/or a write miss curve. The NVM may be implemented using magnetoresistive random-access memory (MRAM), flash memory, ferroelectric random-access memory (FRAM), and/or phase-change random-access memory (PRAM).

According to other examples, a write cache module is provided to manage MRAM cache writes in processors. The module may include a write cache memory and a processor block coupled to the write cache memory. The processor block may be configured to receive a write request including data to be stored in an MRAM cache associated with the write cache module, determine whether the data is to be further processed, and store the data in the write cache memory in response to a determination that the data is to be further processed. The processor block may be further configured to store the data in the MRAM cache in response to a determination that the data is not to be further processed.

According to some embodiments, the processor block may be further configured to receive the data from a predecessor cache and/or a successor memory. The data may be a modified version of another data stored in the write cache memory or the MRAM cache. The data stored in the write cache memory and the data stored in the MRAM cache may be mutually exclusive. The processor block may be further configured to receive a read request for other data, determine whether the other data is stored in the write cache memory or the MRAM cache, retrieve the other data from a successor memory in response to a determination that the other data is not stored in the write cache or the MRAM cache, and store the retrieved other data in the write cache.

According to other embodiments, the processor block may be further configured to determine whether the data is to be further processed based on an eviction policy. The eviction policy may be based on a least-recently-written parameter associated with the data, a write-dead time associated with the data, a number-of-previous-writes parameter associated with the data, a number-of-bursts-of-writes parameter associated with the data, and/or a time-interval-of-cache-residency parameter associated with the data. The processor block may be further configured to determine whether the data is to be further processed based on a determination of whether the data is likely to be written to more than once. The processor block may be further configured to adjust a size of the write cache based on a write distance profile and/or a write miss curve, and/or may include a memory controller configured to perform storage of the data in the write cache memory and in the MRAM cache.

According to further examples, an apparatus of a computational device is provided to manage non-volatile memory (NVM) writes. The apparatus may include a processor core, an NVM communicatively coupled to the processor core, a write cache memory associated with and communicatively coupled to the NVM, and a processor block. The processor block may be configured to determine that data is to be stored in the NVM, determine whether the data is to be further processed, and store the data in the write cache memory in response to a determination that the data is to be further processed. The processor block may be further configured to store the data in the NVM in response to a determination that the data is not to be further processed.

According to some embodiments, the apparatus may further include a predecessor cache and/or a successor memory, and the processor block may be further configured to receive the data from the predecessor cache and/or the successor memory. The data may be a modified version of another data stored in the write cache memory or the NVM. The processor block may be further configured to receive a read request for another data, determine whether the other data is stored in the write cache memory or the NVM, retrieve the other data from a successor memory in response to a determination that the other data is not stored in the write cache or the NVM, and store the retrieved other data in the write cache.

According to other embodiments, the processor block may be further configured to determine whether the data is to be further processed based on an eviction policy. The eviction policy may be based on a least-recently-written parameter associated with the data, a write-dead time associated with the data, a number-of-previous-writes parameter associated with the data, a number-of-bursts-of-writes parameter associated with the data, and/or a time-interval-of-cache-residency parameter associated with the data. The processor block may be further configured to determine whether the data is to be further processed based on a determination of whether the data is likely to be written to more than once. The processor block may be further configured to adjust a size of the write cache based on a write distance profile and/or a write miss curve. The NVM may be implemented using magnetoresistive random-access memory (MRAM), flash memory, ferroelectric random-access memory (FRAM), and/or phase-change random-access memory (PRAM).

The use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and designing the circuitry and/or writing the code for the software and or firmware are possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. Also, the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. A data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. Such depicted architectures are merely exemplary, and in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to manage non-volatile memory (NVM) writes, the method comprising:
   receiving a write request;
   in response to the receipt of the write request, determining whether data to be written is stored in a write cache associated with the NVM;
   in response to a determination that the data to be written is stored in the write cache associated with the NVM:
      determining whether the data is to be further processed based on whether the data is likely to be written onto more than once,
      wherein determining whether the data is to be further processed includes determining whether the data is to be further processed based on an eviction policy,
      wherein the eviction policy is based on a last-write parameter associated with the data, and
      wherein the last-write parameter is based on a write-dead time associated with the data, which corresponds to a predicted time period between a last write to the data and a natural eviction time associated with the data;
   in response to a determination that the data is to be further processed, writing the data stored in the write cache associated with the NVM; and
   in response to a determination that the data is not to be further processed, transmitting a signal to the write cache, wherein the transmitted signal indicates that the data is to be considered for early eviction from the write cache;
   in response to a determination that the data to be written is absent in the write cache associated with the NVM, determining whether the data is stored in the NVM or in a successor memory; and in response to a determination that the data is stored in the NVM or in the successor memory:
  determining whether the data is to be further processed based on whether the data is likely to be written onto more than once;
  in response to a determination that the data is to be further processed, storing the data in the write cache associated with the NVM, wherein storing the data in the write cache includes retrieving the data from the NVM; and
  in response to a determination that the data is not to be further processed, storing the data in the NVM, wherein storing the data in the NVM includes retrieving the data from the successor memory when the data is absent in the NVM and stored in the successor memory.

2. The method of claim 1, further comprising:
receiving a read request for other data;
determining whether the other data is stored in the write cache or in the NVM;
in response to a determination that the other data is not stored in the write cache or in the NVM, retrieving the other data from the successor memory; and
storing the retrieved other data in the write cache.

3. The method of claim 1, wherein the eviction policy is further based on at least one of:
  a least-recently-written parameter associated with the data,
  a number-of-previous-writes parameter associated with the data, and
  a number-of-bursts-of-writes parameter associated with the data.

4. The method of claim 1, wherein the last-write parameter is further based on:
  a time-interval-of-cache-residency parameter associated with the data.

5. The method of claim 1, further comprising adjusting a size of the write cache.

6. The method of claim 5, wherein adjusting the size of the write cache comprises adjusting the size of the write cache based on at least one of a write distance profile and a write miss curve.

7. The method of claim 1, wherein the NVM is implemented using one of: magnetoresistive random-access memory (MRAM), flash memory, ferroelectric random-access memory (FRAM), and phase-change random-access memory (PRAM).

8. A write cache module to manage magnetoresistive random-access memory (MRAM) cache writes in processors, the write cache module comprising:
  a write cache memory; and
  a processor block coupled to the write cache memory and configured to:
    receive a write request that includes data to be stored in an MRAM cache associated with the write cache memory;
    in response to the receipt of the write request, determine whether the data is to be further processed based on whether the data is likely to be written onto more than once,
    wherein to determine whether the data is to be further processed, the processor block is configured to determine whether the data is to be further processed based on an eviction policy,
    wherein the eviction policy is based on a write-dead time associated with the data, and
    wherein the write-dead time corresponds to a predicted time period between a last write to the data and a natural eviction time associated with the data;
    in response to a determination that the data is to be further processed, store the data in the write cache memory; and
    in response to a determination that the data is not to be further processed, store the data in the MRAM cache,
  wherein the write cache memory is adjustable based on a write hit rate of the write cache memory and write energy for the write cache memory and the MRAM cache, and wherein the adjustment of the write cache memory is performed when the write hit rate of the write cache memory is smaller than a threshold.

9. The write cache module of claim 8, wherein the processor block is configured to receive the data from one of a predecessor cache and a successor memory.

10. The write cache module of claim 8, wherein the data includes a modified version of another data stored in one of the write cache memory and the MRAM cache.

11. The write cache module of claim 8, wherein the data stored in the write cache memory and the data stored in the MRAM cache are mutually exclusive.

12. The write cache module of claim 8, wherein the processor block is further configured to:
  receive a read request for other data;
  determine whether the other data is stored in the write cache memory or the MRAM cache;
  in response to a determination that the other data is not stored in the write cache memory or in the MRAM cache, retrieve the other data from a successor memory; and
  store the retrieved other data in the write cache memory.

13. The write cache module of claim 8, wherein the eviction policy is further based on at least one of:
  a least-recently-written parameter associated with the data,
  a number-of-previous-writes parameter associated with the data,
  a number-of-bursts-of-writes parameter associated with the data, and
  a time-interval-of-cache-residency parameter associated with the data.

14. The write cache module of claim 8, wherein the adjustment of the write cache memory is further based on at least one of a write distance profile and a write miss curve.

15. The write cache module of claim 8, wherein the processor block includes a memory controller configured to perform storage of the data in the write cache memory and in the MRAM cache.

16. The write cache module of claim 8, wherein:
  the MRAM cache is associated with a first write speed and a first read speed,
  the write cache memory is associated with a second write speed and a second read speed,
  the second write speed is faster than the first write speed, and
  the second read speed is slower than the first read speed.

17. An apparatus of a computational device to manage non-volatile memory (NVM) writes, the apparatus comprising:
  a processor core;
  an NVM communicatively coupled to the processor core;
  a write cache memory associated with and communicatively coupled to the NVM; and
  a processor block configured to:

determine that data is to be stored in the NVM;
in response to the determination that the data is to be stored in the NVM, determine whether the data is to be further processed based on whether the data is likely to be written onto more than once;
wherein to determine whether the data is to be further processed, the processor block is configured to determine whether the data is to be further processed based on an eviction policy,
wherein the eviction policy is based on a write-dead time associated with the data, and
wherein the write-dead time corresponds to a predicted time period between a last write to the data and a natural eviction time associated with the data;
in response to a determination that the data is to be further processed, store the data in the write cache memory; and
in response to a determination that the data is not to be further processed, store the data in the NVM,
wherein the write cache memory is adjustable based on a write hit rate of the write cache memory and write energy for the write cache memory and the NVM, and wherein the adjustment of the write cache memory is performed when the write hit rate of the write cache memory is smaller than a threshold.

18. The apparatus of claim 17, further comprising a predecessor cache and/or a successor memory, wherein the processor block is configured to receive the data from the predecessor cache or the successor memory.

19. The apparatus of claim 17, wherein the data includes a modified version of another data stored in one of the write cache memory and the NVM.

20. The apparatus of claim 17, wherein the processor block is further configured to:
receive a read request for other data;
determine whether the other data is stored in the write cache memory or in the NVM;
in response to a determination that the other data is not stored in the write cache memory or in the NVM, retrieve the other data from a successor memory; and
store the retrieved other data in the write cache memory.

21. The apparatus of claim 17, wherein the adjustment of the write cache memory is further based on at least one of a write distance profile and a write miss curve.

22. The apparatus of claim 17, wherein the NVM is implemented with one of magnetoresistive random-access memory (MRAM), flash memory, ferroelectric random-access memory (FRAM), and phase-change random-access memory (PRAM).

* * * * *